(12) United States Patent
Contreras et al.

(10) Patent No.: US 8,503,125 B2
(45) Date of Patent: Aug. 6, 2013

(54) CHANNEL-SOURCE LASER-PULSING SYSTEM ARCHITECTURE FOR THERMAL-ASSISTED RECORDING

(75) Inventors: John Contreras, Palo Alto, CA (US); Weldon Hanson, Rochester, MN (US); Barry C. Stipe, San Jose, CA (US); Rehan Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 82 days.

(21) Appl. No.: 13/117,300

(22) Filed: May 27, 2011

(65) Prior Publication Data

US 2012/0300599 A1    Nov. 29, 2012

(51) Int. Cl.
G11B 5/02 (2006.01)
(52) U.S. Cl.
USPC ............................... 360/59; 369/100; 360/51
(58) Field of Classification Search
None
See application file for complete search history.

(56) References Cited

U.S. PATENT DOCUMENTS

| | | | | |
|---|---|---|---|---|
| 5,170,383 A * | 12/1992 | Yonezawa et al. | ......... | 369/13.14 |
| 6,388,954 B1 * | 5/2002 | Awano et al. | ............. | 369/13.02 |
| 6,424,601 B1 * | 7/2002 | Oonuki et al. | ............. | 369/13.08 |
| 6,493,164 B1 | 12/2002 | Kikitsu et al. | | |
| 6,628,574 B1 * | 9/2003 | Shimazaki et al. | ......... | 369/13.09 |
| 6,809,908 B1 | 10/2004 | Ito et al. | | |
| 6,950,260 B2 | 9/2005 | Coffey et al. | | |
| 7,136,328 B2 | 11/2006 | Miyaoka | | |
| 7,791,829 B2 * | 9/2010 | Takeo et al. | ...................... | 360/55 |
| 7,796,353 B2 * | 9/2010 | Schabes et al. | ................. | 360/59 |
| 7,852,587 B2 * | 12/2010 | Albrecht et al. | ................ | 360/59 |
| 2008/0204917 A1 | 8/2008 | Nakamura et al. | | |
| 2010/0202256 A1 | 8/2010 | Ito et al. | | |
| 2010/0238580 A1 | 9/2010 | Shimazawa et al. | | |

FOREIGN PATENT DOCUMENTS

| | | |
|---|---|---|
| JP | 6-243527 | 9/1994 |
| JP | 2000242903 | 9/2000 |
| JP | 2001283402 | 10/2001 |
| JP | 2002298301 | 10/2002 |
| JP | 2004355739 | 12/2004 |

OTHER PUBLICATIONS

Baoxi Xu et al., Thermal Effects in Heat Assisted Bit Patterned Media Recording, IEEE Transactions on Magnetics, vol. 45, Issue 5, May 2009, pp. 2292-2295, Publisher: IEEE Magnetics Society, United States.

* cited by examiner

*Primary Examiner* — Jason Olson
(74) *Attorney, Agent, or Firm* — Patterson & Sheridan, LLP

(57) ABSTRACT

A method and apparatus for generating a laser signal for driving a laser used in thermal-assisted recording. A channel of a hard drive generates a high-frequency component of the laser signal—e.g., a periodic wave or series of pulses—and synchronizes the phase of the laser signal with a corresponding write data signal which controls the magnetization of data bits within the magnetic disk of the hard drive. The channel may be connected to a read/write integrated circuit via a channel interconnect. The read/write circuit may include a second phase control to compensate for any phase shift and an adder circuit to combine the transmitted high-frequency laser with a DC bias. Further, the read/write circuit may include a feedback loop for adjusting the DC bias based on environmental parameters of the hard drive such as temperature.

20 Claims, 7 Drawing Sheets

CHANNEL-SOURCE LASER-PULSING SYSTEM ARCHITECTURE FOR THERMAL-ASSISTED RECORDING

BACKGROUND OF THE INVENTION

1. Field of the Invention

Embodiments of the present invention generally relate to an integrated circuit in a hard disk drive. Specifically, the invention relates to circuits for driving a heating element to aid in writing data to high coercivity media.

2. Description of the Related Art

Perpendicular magnetic recording, where the recorded bits are stored in a planar recording layer in a generally perpendicular or out-of-plane orientation (rather than parallel to the surface of the recording layer), is a one path toward ultra-high recording densities in magnetic recording systems, such as hard disk drives. The perpendicular magnetic recording layer is typically a continuous layer on the disk substrate, like in conventional magnetic recording disk drives. However, magnetic recording disk drives with patterned perpendicular magnetic recording layers increase data density by recording bits in a perpendicular orientation. In patterned media, the perpendicular magnetic recording layer on the disk is organized into small isolated data islands arranged in concentric data tracks. To produce the magnetic isolation of the patterned data islands, the magnetic moment of the spaces or regions between the data islands is not present or substantially reduced to render these regions essentially nonmagnetic. Alternatively, the media may be fabricated so that there is no magnetic material in the regions between the data islands.

A problem associated with continuous perpendicular magnetic recording media is the thermal instability of the recorded magnetization patterns. In continuous perpendicular magnetic recording layers, the magnetic material (or media) for the recording layer on the disk is chosen to have sufficient coercivity such that the magnetized data bits are correctly written and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_U$) may be required. However, increasing $K_U$ in recording media also increases the switching field, $H_0$, which is proportional to the ratio $K_U/M_S$, where $M_S$ is the saturation magnetization (the magnetic moment per unit volume). The switching field $H_0$ is the field required to reverse the magnetization direction when the magnetic media is subjected to short time intervals. For modern hard disk drives, this time interval is around 1 ns.

One approach to addressing the problem of providing a strong enough switching field $H_0$ for high coercivity media is thermally-assisted recording (TAR) using a magnetic recording disk like that described in U.S. Pat. No. 6,834,026 B2, assigned to the same assignee as this application. This disk has a bilayer medium of a high-coercivity, high-anisotropy ferromagnetic material like FePt as the storage or recording layer and a material like FeRh or Fe(RhX) (where X is Ir, Pt, Ru, Re or Os) as a "transition" layer that exhibits a transition or switch from antiferromagnetic to ferromagnetic (AF-F) at a transition temperature less than the Curie temperature of the high-coercivity, high-anisotropy material of the recording layer. The recording layer and the transition layer are ferromagnetically exchange-coupled when the transition layer is in its ferromagnetic state. To write data, the bilayer medium is heated above the transition temperature of the transition layer with a separate heat source, such as a laser or electrically resistive heater. When the transition layer becomes ferromagnetic, the total magnetization of the bilayer is increased, and consequently the switching field required to reverse a magnetized bit is decreased without lowering the anisotropy of the recording layer. The magnetic bit pattern is recorded in both the recording layer and the transition layer. When the media is cooled to below the transition temperature of the transition layer, the transition layer becomes antiferromagnetic and the bit pattern remains in the high-anisotropy recording layer.

Generally, a laser may be focused onto a spot of the magnetic disk (i.e., a single bit) to heat up the spot and lower the coercivity of the magnetic material. A write head then projects the desired magnetic field through the heated spot. The magnetic material of the spot then aligns with the magnetic field. As the spot cools, the coercivity increases and stabilizes the magnetic field of the high-anisotropy layer. Thus, a read pole is able to pass over the spot, detect the magnetic field, and interpret the bit pattern.

Ideally, the laser is focused only on the bit whose magnetic orientation will be changed by the write head. Heating up surrounding bits lower their coercivity and increases the risk that their orientations will be changed by the write head. Unfortunately, light's diffraction limit generally prevents lenses from focusing down a beam spot to less than half of the light's wavelength. Given the wavelength of optical lasers, lenses can focus the light to around 200 nm. If a 1 Tb density is to be achieved, the spot size of the laser should closely follow the width of a bit—i.e., tens of nanometers. Recently, different mirrors or waveguides may be used to focus light down to a quarter of its wavelength. However, this still does not produce a beam spot that focuses solely on a single bit of a magnetic disk.

What is needed is an apparatus that minimizes the effect of a laser's beam spot on surrounding bit patterns.

SUMMARY OF THE INVENTION

The present invention generally relates to an integrated circuit in a hard disk drive. Specifically, the invention relates to circuits for driving a heating element to aid in writing data to high coercivity media.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention is generally related to circuitry that provides a signal for driving a heating element in a thermal assisted recording (TAR) or heat-assisted magnetic recording (HAMR) enabled disk storage system. The circuitry generates a signal comprising a high-frequency component that minimizes the effects of the heating element on neighboring bits and tracks of the magnetic media. The circuitry may also add a DC-offset to the signal for additional control of the heating element.

Figure 1:
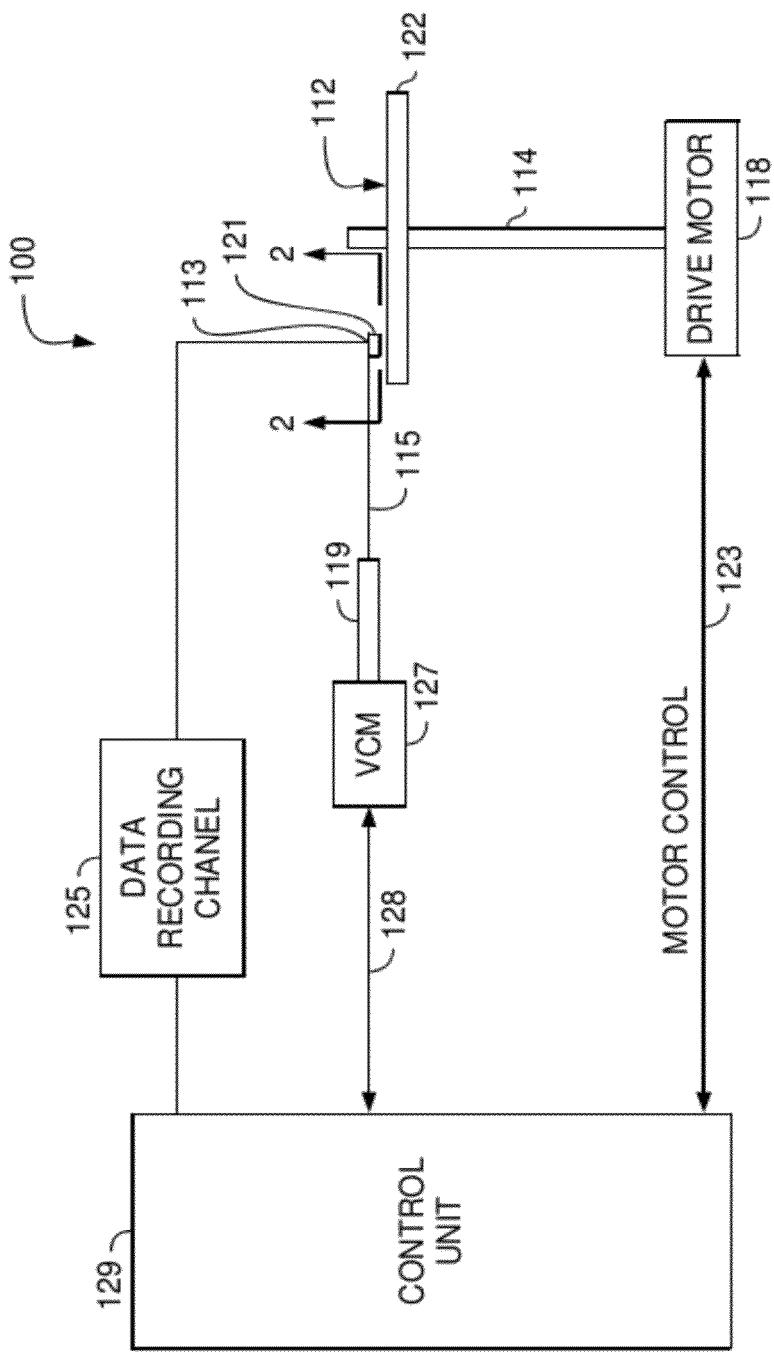
FIG. 1 illustrates a hard disk drive, according to embodiments of the invention.

FIG. 1 illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of a TAR or HAMR enabled disk storage system, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Laser Modulation

A laser used in TAR or HAMR may be powered by a DC signal, an AC signal, or some combination or both. Driving the laser using only the DC signal (or low frequency mode) provides a constant heat to the magnetic disk 112. Driving the laser using only the AC signal provides more flexibility, such as changing the duty cycle of the signal (in case of a series of high-frequency pulses) or the phase of the signal driving the laser relative to the phase of the write signal.

Though the figures and accompanying description specifically discuss using a laser as a heating element, the invention is not limited to such. The same principles discussed here may be applied to any device used to heat a portion of the magnetic media in a disk storage system.

Figure 2:
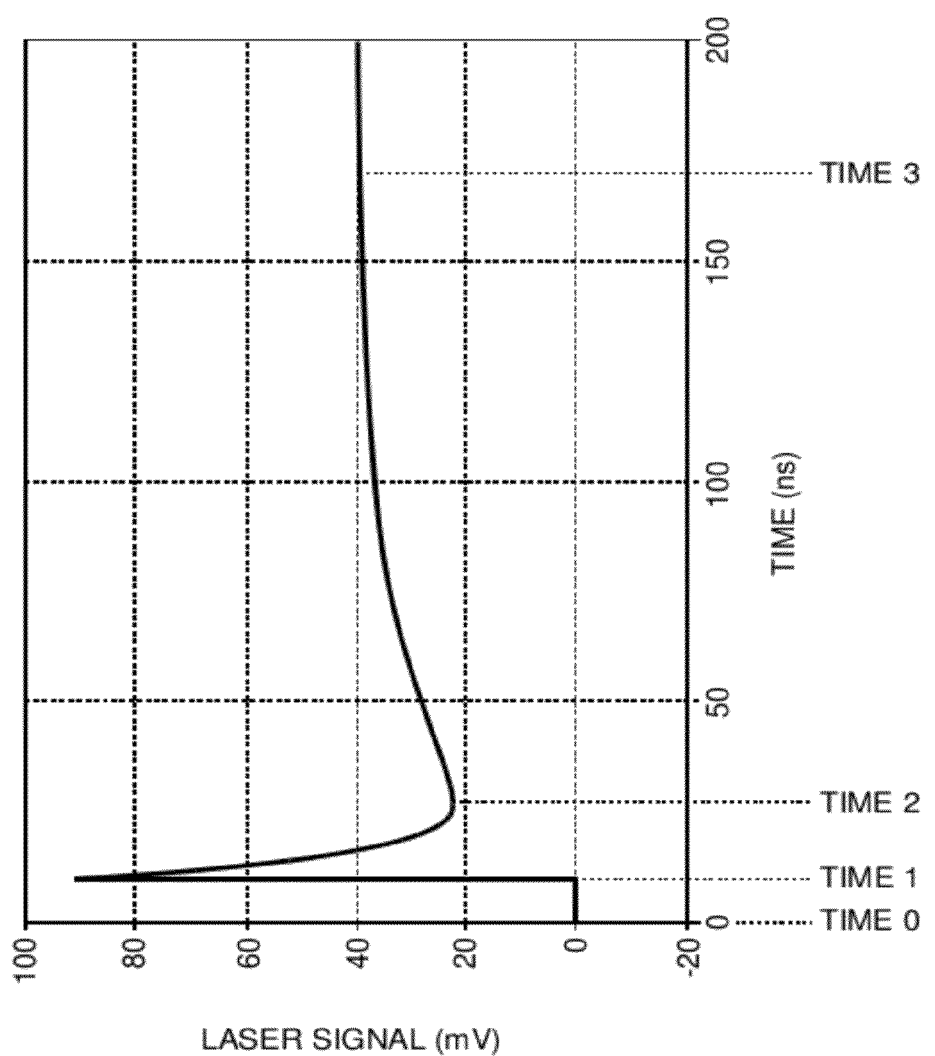
FIG. 2 shows a low frequency signal for driving a heating element, according to embodiments of the invention.

FIG. 2 is a low frequency approach to heating a magnetic medium, according to embodiments of the invention. As shown, at time 0, the laser is off. This may be the case when the disk drive 100 is reading data from the magnetic disk 112 or when the write head has reached a portion of the disk 112 that does not need the magnetic orientation of the underlying bits changed. In either case, the laser signal is preferably zero when data is not being written to the disk. Doing so prevents the laser from heating the magnetic disk 112 which may destabilize the magnetic orientation of the bits.

At time 1, circuitry (e.g., the control unit 129) begins to supply current to the laser. As used herein, the term "laser current" may be used interchangeable with the "laser signal", the difference being that the laser signal may be a pre-amplified voltage that is then transmitted to a current source that drives the laser. In one embodiment, time 1 coincides with a write signal sent to the write head. In another embodiment, the write signal (not shown) may be delayed relative to the laser signal so that the laser first heats a portion of the magnetic disk before attempting to write data to that portion. Once the laser is turned on, the DC signal may spike before exponentially decreasing. This rapid rise quickly heats a portion of the magnetic disk so that writing may happen simultaneously at time 1. Moreover, the laser may require time to "warm up" and thus needs the extra current provided by the spike to sufficiently heat the magnetic disk 112 at the initial stages of writing data.

Between time 1 and time 2, the laser signal is decreased so that the heat from the laser does not affect the neighboring bits on concentric data tracks. For example, in practical applications, the intensity of a laser spot is distributed as a normal distribution (i.e., a bell curve) rather than a uniform distribution. Preferably, the laser spot would affect only the bit whose magnetic orientation is to be changed (i.e., a uniform distribution). However, with a normal distribution, a portion of the laser spot will contact a separate bit and heat up the associated magnetic material. Decreasing the current supplied to the laser decreases the heat emanating onto the neighboring data tracks.

At time 2 the laser signal begins to increase again. In one embodiment, the disk drive 100 includes temperature sensors or laser power detectors to measure the amount of energy being transferred from the laser to the magnetic disk 112. As such, the sensors or detectors may indicate that the laser signal has overcompensated for the effects of spiking the signal at time 1. Accordingly, between time 2 and time 3 the laser signal gradually increases—i.e., the DC signal driving the current is increased. The sensors or detectors provide a feedback loop that enables the laser to provide an optimum heat to the bits. At time 3 a steady state solution is achieved, for example, when the temperature in the disk drive 100 has stabilized. Note that the hard drive 100 may continue to adjust the DC signal in response to changed environmental conditions.

Figure 3:
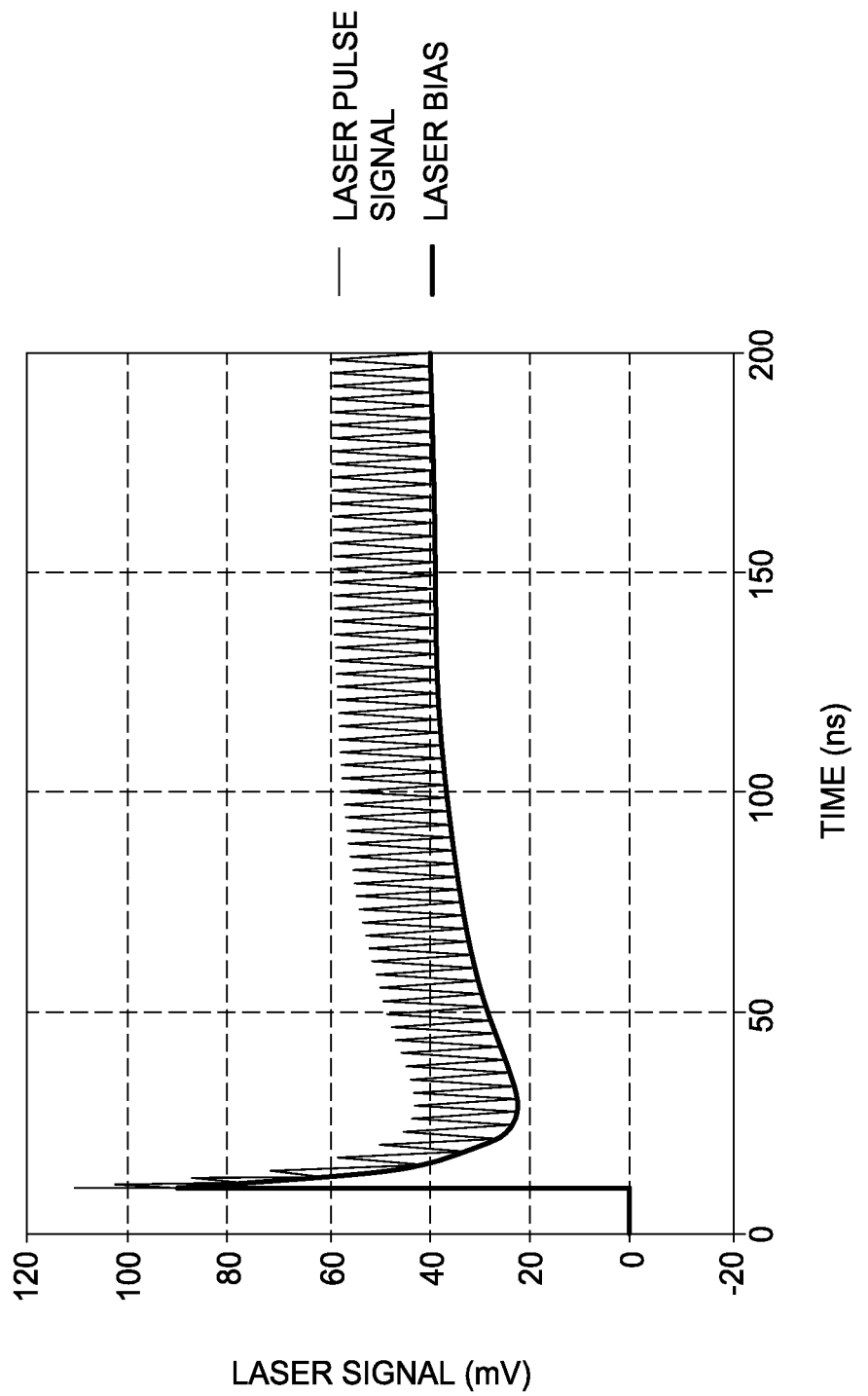
FIG. 3 is a combination of a low frequency and high frequency signal for modulating a heating element, according to an embodiment of the invention.

FIG. 3 illustrates a laser signal that combines a low-frequency signal with a high-frequency signal to modulate a laser for heating a magnetic medium, according to an embodiment of the invention. The low-frequency signal that generated FIG. 1 is repeated in FIG. 2. However, the low-frequency signal is added with a high-frequency or AC signal. That is, FIG. 2 illustrates an AC signal with a DC offset. Adding the AC signal advantageously permits the laser to heat data tracks with narrower widths as defined in the radial direction of the magnetic disk 112 by not allowing the laser heating to spread which may occur if the laser is driven by only a high power DC bias.

Figure 4A:
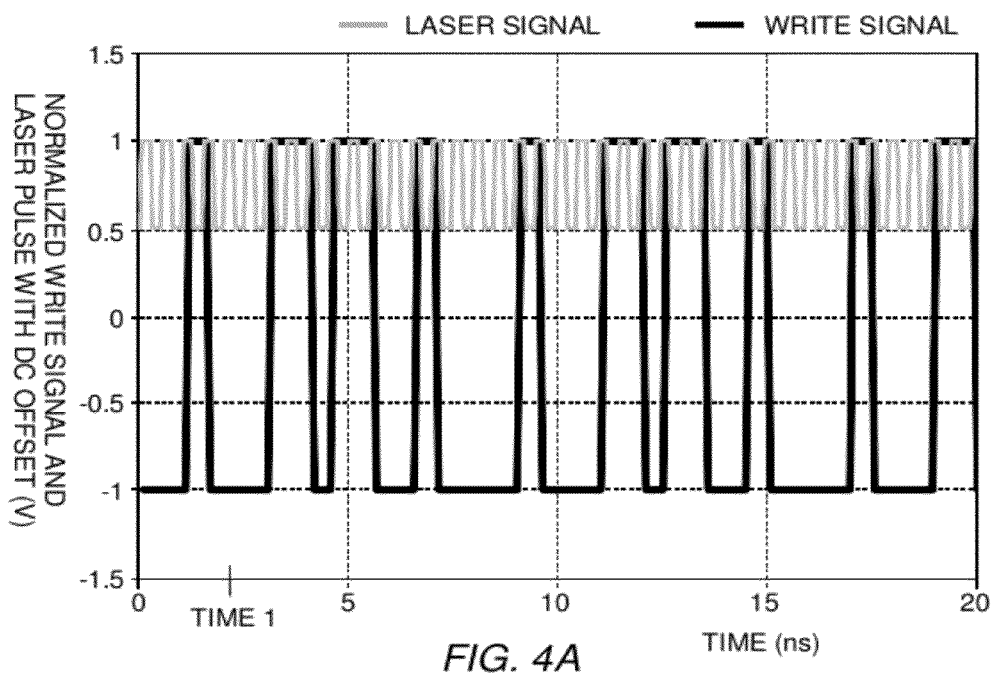
FIGS. 4A-B illustrate a write signal and a corresponding heating element signal, according to an embodiment of the invention.
Figure 4B:
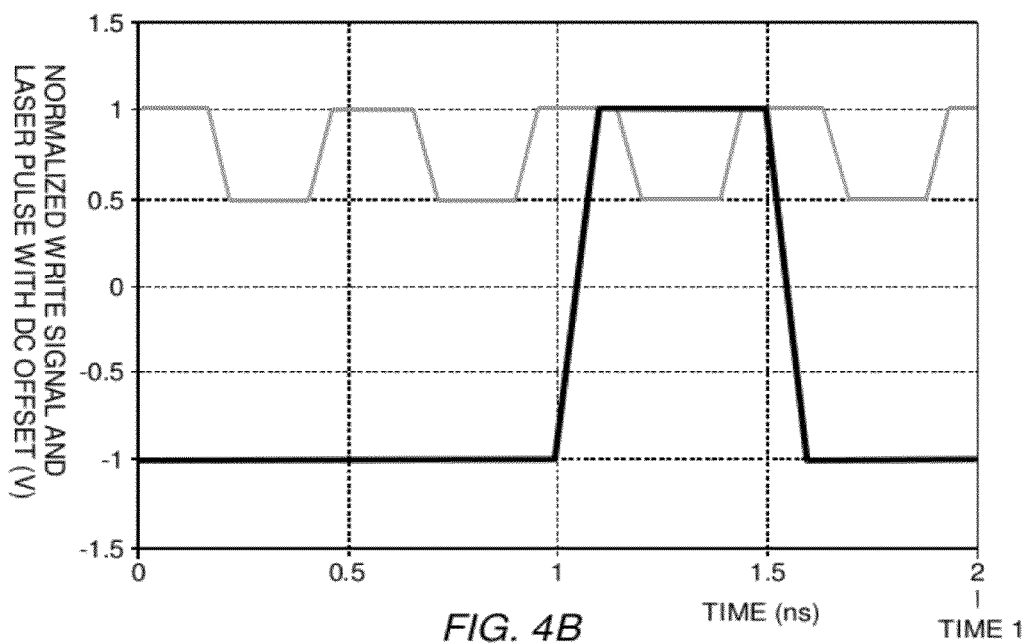

FIGS. 4A-B illustrate a write signal and a corresponding laser signal, according to an embodiment of the invention. As shown, the write signal is included on the same graph as the modulated laser signal. The write signal is modulated to correspond to the write head passing over a data bit in a particular track. A write signal with a positive voltage generates a magnetic field with a first polarity in a write head and a corresponding data bit while negative voltage generates a magnetic field with a second polarity in a data bit. In this manner, data is written to each data bit along a data track.

The laser signal corresponds to the write signal and includes both a low-frequency and high-frequency signal components. The low-frequency signal component—i.e., the DC bias—changes little over short periods of time (i.e., less than a micro second) while the high-frequency component (or pulse) has a defined amplitude, frequency, phase, and duty cycle at the data clock rate. Moreover, the frequency of the high-frequency component may be derived from, or the same as, a clock signal generated by a clock generating circuit in the hard drive system. In some embodiments, the frequency of the high-frequency signal component of the laser signal is independent of the frequency of the write data signal, though this is not a requirement. The high-frequency signal may not be a square wave or series of pulses but may be a sinusoidal, triangular, or sawtooth wave. As shown in FIG. 3, the DC offset may be changed without interfering with the amplitude or duty cycle of the pulse. Similarly, the amplitude, frequency, phase and duty cycle may change without affecting the DC offset. For example, in one embodiment the frequency and phase of the laser signal may be adjusted to match the frequency and phase of the write signal rather than the clock signal.

The high-frequency signal may range from hundreds of Hz to tens of GHz. In one embodiment, the high-frequency signal corresponds to the data rate of the hard drive—i.e., 1-2 GHz. As the data rate of a hard drive increases, the high-frequency component may increase at the same delta. Moreover, the high-frequency signal may operate at speeds that are greater than the data rate (e.g., 2-6 GHz).

FIG. 4B illustrates a magnified version of FIG. 4A from time 0 to time 1.

Laser Modulation Circuit

Figure 5:
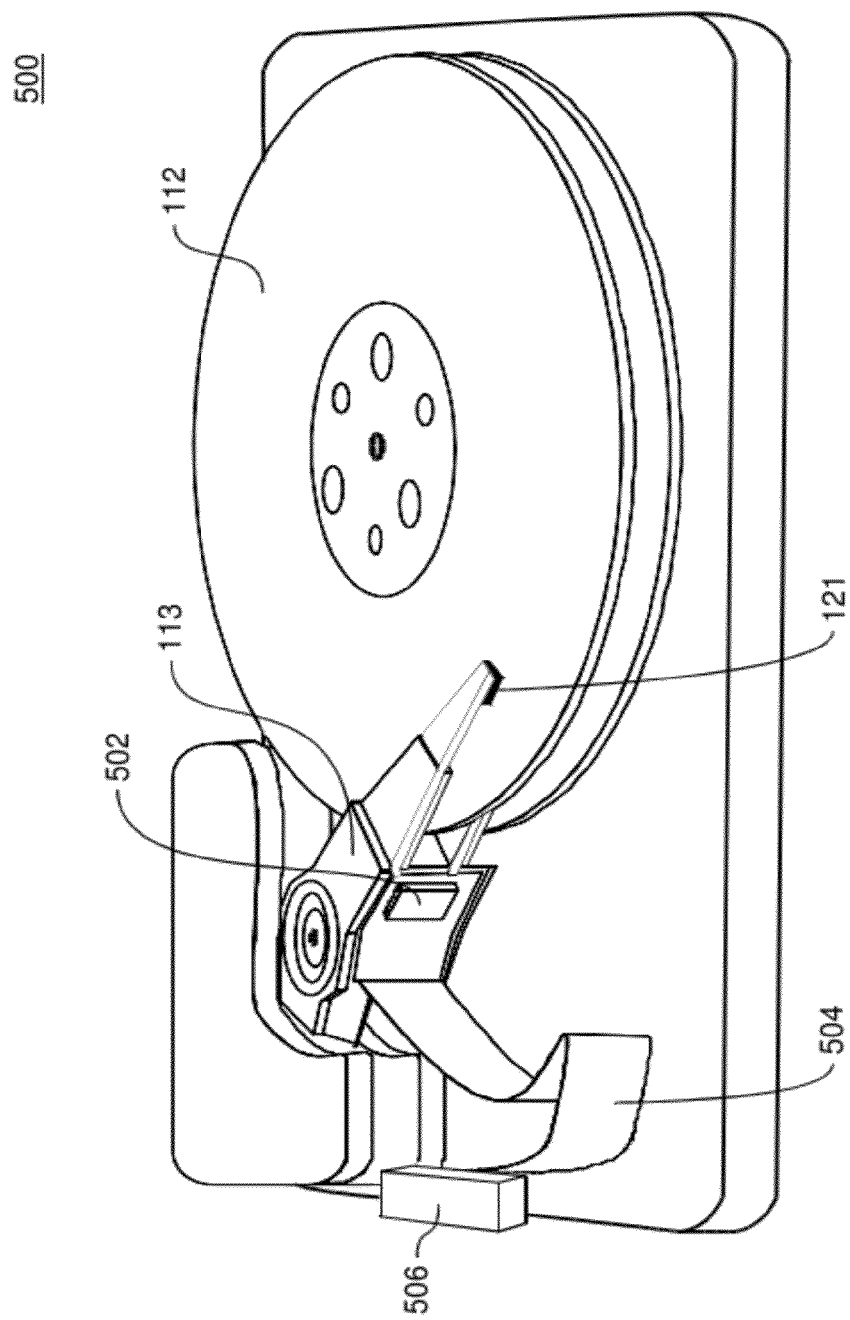
FIG. 5 is a diagram of a hard disk drive, according to embodiments of the invention.

FIG. 5 is a diagram of a hard drive, according to embodiments of the invention. The hard drive 500 includes many of the same features found in the hard drive 100 of FIG. 1 such as a magnetic disk with a magnetic disk surface 112, magnetic write head assemblies 121 and a slider 113 for positioning the write head 121 over a particular data track. The hard drive 500 also includes a channel 506 coupled to a read/write circuit by a channel interconnect 504. In one embodiment, the channel 506 is an independent integrated circuit with separate inputs and outputs. In another embodiment, the channel 506 is part of larger integrated circuit such as a disk electronic card or a system on a chip (SOC). That is, the channel 506 may be only one part of a SOC where the SOC controls other functions of the hard drive 500.

The channel interconnect 504 is a cable, consisting of one or more wires, that transfers data between the channel 506 and the read/write circuit 502. The read/write circuit 502 is an integrated circuit which sends the write and laser signal to the write head assemblies 121. Moreover, the read/write circuit 502 may read already stored data from the magnetic disk surface 112 and transmit the data to the channel 506.

Figure 6:
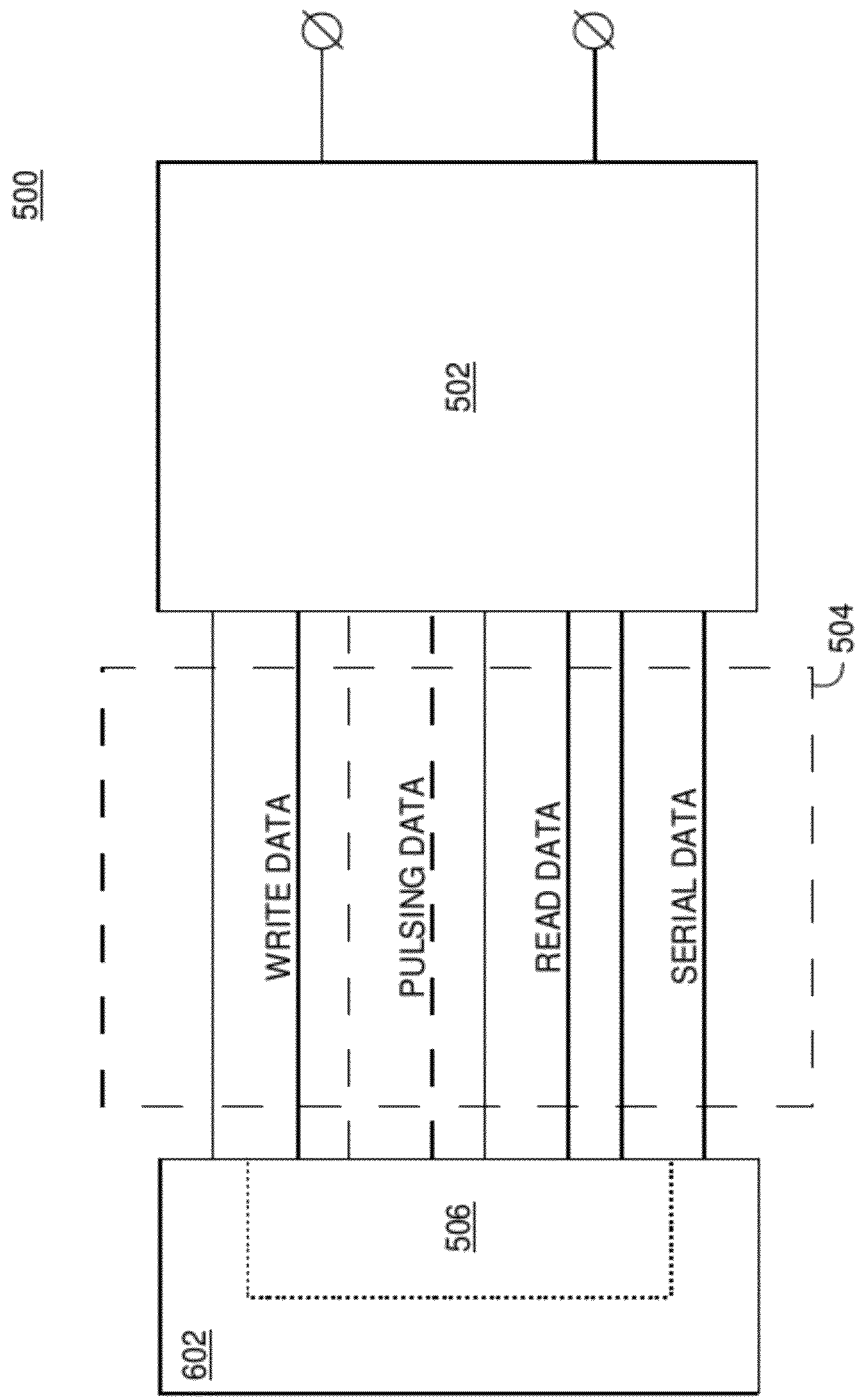
FIG. 6 is a block diagram of the hard disk drive, according to embodiments of the invention.

FIG. 6 is a block diagram of the hard drive 500, according to embodiments of the invention. FIG. 6 includes a SOC 602 with a channel 506 portion that is connected to the read/write circuit 502 by the channel interconnect 504. Specifically, the channel interconnect 504 is shown with three assigned data paths illustrated by the solid lines. The channel interconnect 504 may have an optional data path for carrying the pulsing data—e.g., the high-frequency or low-frequency component of the laser signal. As used herein, the pulsing data may include only one or both of the low-frequency and high-frequency components of the laser signal. A data path may include a plurality of lines or wires for transmitting data either in serial or in parallel. The read/write circuit 502 uses the write data received by the channel 506 to generate the write signal shown in FIGS. 4A-4B. The read/write circuit 502 transmits the read data that is read from the magnetic disk 112 to the SOC 602. The serial data path will be discussed in further detail below.

In one embodiment, the read data and pulsing data share the same data path. Doing so permits the channel 506 to be compatible with prior SOC 602 designs and channel interconnects 504. In this embodiment, when accessed, a hard drive 500 is either writing to or reading from the magnetic disk 112, but never doing both simultaneously. The magnetic head assembly 121 contains both a read pole for detecting the magnetic fields of data bits as well as a write pole for altering the magnetic fields of the data bits. If the two were active simultaneously, the read pole may detect the magnetic field emitted by the write pole rather than the magnetic field of the underlying data bits. Crosstalk and power surges may also interfere with the two separate functions. Accordingly, when the channel 506 transmits write data to the read/write circuit 502, the read/write circuit 502 will not be transmitting read data to the channel 506 (assuming no buffering of data). That is, when writing to the magnetic disk 113, the read data path is not used.

The pulsing data, which drives the laser current, may only be transmitted when writing to the magnetic disk 113 to prevent unnecessary heating of the magnetic media. Accordingly, the pulsing data may be multiplexed with the read data on the read data path. Stated differently, the pulsing data (or laser signal) share the same assigned data path as the read data. This design permits the use of prior art channel interconnects 504 as well as avoiding redesigning the interfaces of the channel 506 and read/write circuit 502 that couple to the channel interconnect 504 to accommodate a separate pulsing data path. For this reason, the pulsing data path in the channel interconnect 504 is ghosted to show that an assigned data path is optional.

The Channel Integrated Circuit

Figure 7:
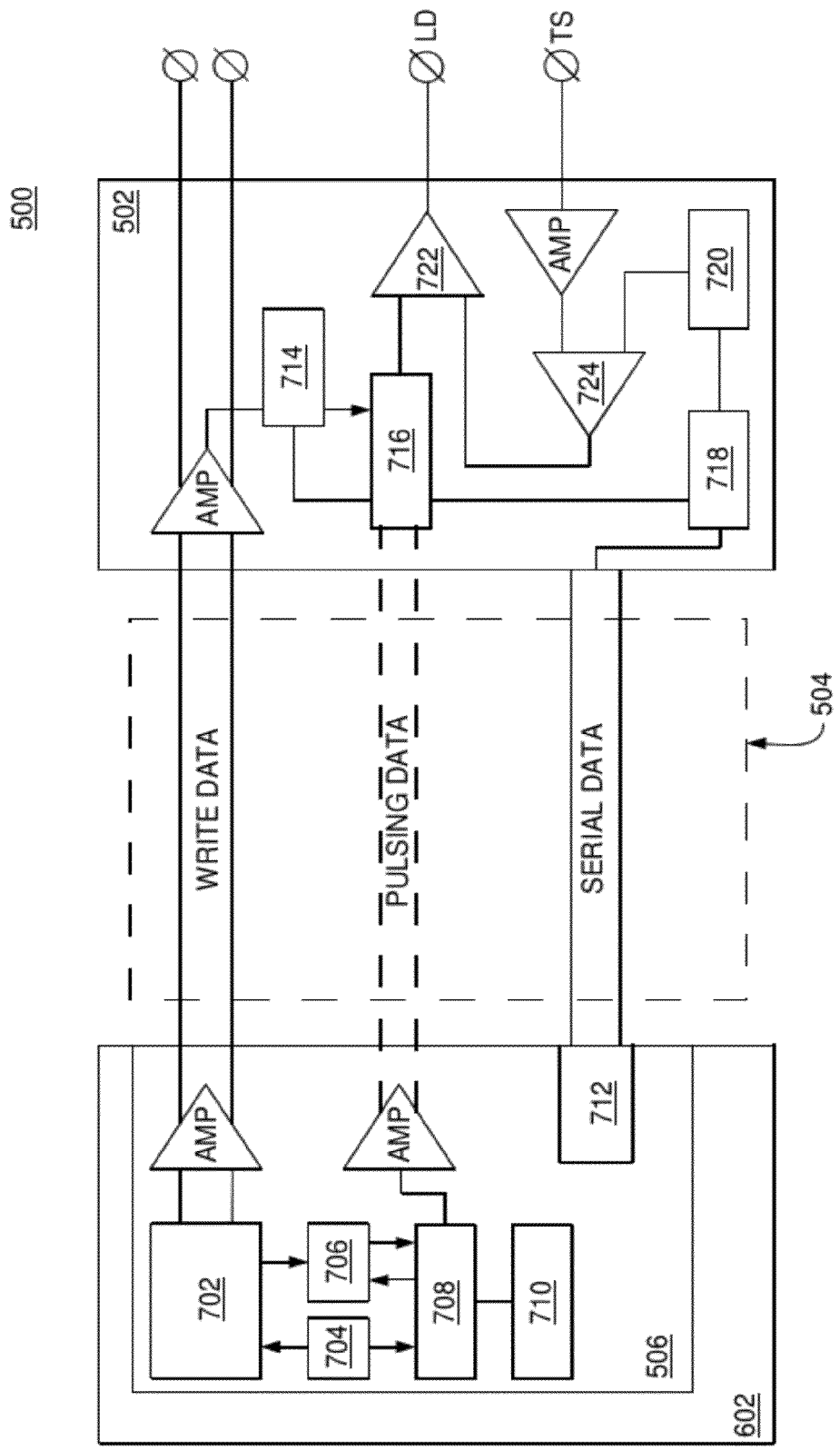
FIG. 7 is a block diagram of a hard disk drive, according to embodiments of the invention.

FIG. 7 is a block diagram of a hard drive 500, according to embodiments of the invention. FIG. 7 shows in detail the different circuit components that make up the SOC 602, channel 506 and read/write circuit 502.

The channel 506 includes a write data precompensation module 702, a clock signal module 704, a channel phase control 706, a pulse generator 708, a pulse width and phase control register 710, and a DC bias/shaping register 712. The write data and precompensation module 702 receives the write data from either other components included in the SOC 602 or from a computing system associated with the hard drive 500. Specifically, the write data precompensation module 702 generates a write signal that is then transmitted via the write data path of the channel interconnect 504 to the read/write circuit 502. For example, the write data precompensation module 702 permits the use of stronger magnetic fields to write data in sectors that are closer to the center of the magnetic disk where data may be packed tighter than the outer sectors. Moreover, the write data precompensation module 702 may phase shift certain received bit patterns. The write data precompensation module 702 translates the bit pattern into a write signal like that shown in FIG. 4A. That is, the output of the write data precompensation module 702 comprises of a signal which transitions from a positive to a negative value. According to the value, a magnetic field with a certain polarity is formed in a write pole of the magnetic head assembly 113.

The clock signal module 704 either generates a clock signal for the hard drive 500 or receives a master clock signal from a clock generating circuit in the hard drive. For example, the clock signal module 704 may include an oscillator for generating the appropriate clock signal. The clock signal module 704 then transmits a clock signal to both the write data precompensation module 702 and the pulse generator 708. The clock signal may be used by the respective components to generate one or both of the laser and the write data signals. The clock signal may range from 1-2 GHz, which corresponds to data rates from 1-2 Gb/s (gigabits per second), though rates may increase along with data rates. That is, the clock signal may exceed 2 GHz.

In one embodiment, the clock signal used to generate the high-frequency component of the laser signal is not generated based on the write data signal. That is, the clock signal module 704 does not accept as an input the write data signal but instead generates a clock signal for generating the laser signal independently of the write data signal. In this manner, the clock signal may be used to generate both the laser signal and the write data signal.

The pulse generator 708 generates the laser signal for driving the laser. In one embodiment, the pulse generator 708 only generates a laser signal with one signal component. That is, either the low or high-frequency component may be added to the laser signal later in a different integrated circuit. Nonetheless, the low- and high-frequency components of the laser signal may be then coupled together using a direct-connection for the low-frequency component, and using an AC coupling (capacitor) for the high-frequency component. In one embodiment, the pulse generator 708 on the channel 506 generates only the high-frequency component of the laser signal. The pulse generator 708 receives input from a pulse width and phase control (PW/PC) register 710. The PW/PC register 710 may be implemented by any form of volatile or non-volatile memory such as ROM, flash memory, MRAM, DRAM, or SRAM. Further, the PW/PC register 710 may be located in a different part of the SOC or stored in a device separate from the hard drive 500.

In general, the settings stored in the PW/PC register 710 determine the width of the pulse (i.e., the duty cycle) in addition to the initial phase of the high-frequency signal with respect to the write data signal. As shown in FIGS. 4A-B, the duty cycle of the laser signal—i.e., the signal generated by the pulse generator 708—is approximately 50%. That is, stored settings of the PW/PC register 710 which when transmitted to the pulse generator 708 produce a signal with a high-frequency pulse that is on half a cycle and off half a cycle. The settings in the PW/PC register 710 may be loaded upon manufacturing (i.e., predetermined) or changed dynamically by using a feedback loop which will be discussed below. Advantageously, the settings in the PW/PC register 710 may be changed to create any duty cycle that reduces the effect of the laser on neighboring data tracks (i.e., reduce the spreading of the laser's spot size compared to a laser only powered by a DC signal). Moreover, the PW/PC register 710 may control the amplitude of the high-frequency signal generated by the pulse generator 708.

In addition to controlling the amplitude, frequency, and pulse width (i.e., duty cycle) of the high-frequency pulse, the channel phase control 706 synchronizes the respective phases of the write signal generated by the write data precompensation module 702 and the pulse generator 708. The channel phase control 706 receives as inputs the high-frequency signal of the pulse generator 706 and the write signal and adjusts the phase of the high-frequency signal by comparing its phase to the phase of the write signal. For example, the phase control 706 may be a phase-locked loop (PLL). In general, phase detectors of the write data signal and the high-frequency component of the laser signal are the inputs to a PLL which is then used to control the phase between the two signals. In one embodiment, the write signal from the write data and precompensation module 702 serves as the reference signal for comparing the write signal to the high-frequency signal of the pulse generator 708. The PLL adjusts a frequency of an oscillator in a feedback look to synchronize the phases of the two signals. The phase adjusted laser signal is then returned to the pulse generator 708. FIGS. 4A-B show the effect of passing both the write and laser signals through the phase control 706 with their resulting locked phases.

In one embodiment, the channel phase control 706 receives a predetermined phase shift from the PW/PC register 710. For example, the phase shift may be zero, in which case the phases of the write and laser signals would be the same relative to each other, i.e., matched. Alternatively, the phase shift may delay one signal with respect to the other.

In one embodiment, the phase control 706 may have a predetermined setting that adjusts the phases of the laser signal and the write data signal to correspond to the transitions of the data signal. For example, when the write data signal is transitioning (i.e., when the write data signal is changing the orientation of the underlying magnetic media), the phase control 106 may synchronize the phases of the signals such that the pulse or the high-frequency component of the laser signal is also rising or at a peak at the same time. The stronger laser signal heats the magnetic media and lowers the coercivity.

In FIG. 7, the pulsing data (i.e., the high-frequency signal) produced by the pulse generator 708 may be fed into an amplifier and transmitted to the read/write circuit 502. Alternatively, the pulsing data may be multiplexed onto the read data path of the channel interconnect 504 as represented by the ghosted lines. Similarly, the write data, i.e., the write signal, is transmitted through a data path in the channel interconnect 504 to the read/write circuitry 502.

In one embodiment, the channel 506 may only generate the high-frequency signal of a laser signal but may still store the settings for the low-frequency signal in the DC bias/shaping register 712 which may be implemented by any form of volatile or non-volatile memory such as ROM, flash memory, MRAM, DRAM, or SRAM. As will be discussed in greater detail below, the DC bias/shaping register 712 includes the necessary information for adjusting the DC bias or low-frequency signal of the laser signal based on the environmental parameters measured in the hard drive 500. Such parameters include the temperature in the hard drive or the temperature of the magnetic disk. Moreover, the DC bias/shaping register 712 may include settings that predefine the DC bias of the laser during particular occurrences such as when the laser first powers on. For example, as shown in FIG. 2 between time 1 and time 2, the DC bias may spike but decrease exponentially so that the magnetic materials are heated up quickly. Accordingly, the settings stored in the DC bias/shaping register 712 may govern the low-frequency signal. In contrast, the measured environmental data may control the low-frequency signal after the start-up is complete—e.g., time 2 through time 3 of FIG. 2. In such a case, the DC bias/shaping register 712 may contain look-up tables that determine the DC bias according to the measured temperature of the magnetic disk 112. Again referring to FIG. 7, the channel interconnect 504 couples the DC bias/shaping register 712 to the read/write circuit 502 via the serial data path.

Read/Write Integrated Circuit

FIG. 7 illustrates that the write data, pulsing data, and serial data are passed via the channel interconnect to the read/write circuit 502. The write data (i.e., write signal) may then be amplified and transmitted to a write head pole located on, for example, the magnetic head assembly 121. The read/write circuit 502 includes a pulse buffer 716, a read/write (R/W) phase control 714, a pulse shaping register 718 and a DC bias register 720. The pulse buffer 716 receives the high-frequency component of the laser signal—i.e., the pulsing data when the laser signal is a series of pulses or a square wave—from the channel interconnect 504.

In one embodiment, the pulse buffer 716 transmits the received laser signal to the R/W phase control 714. The R/W phase control 714 may be implemented by a PLL similar to the channel phase control 706. The R/W phase control 714 may be used to correct any phase shifts between the write and laser signals that occurs because of environmental parameters such as temperature. That is, the R/W phase control 714 resynchronizes the phases of the write and laser signals according to the embodiments discussed above.

The pulse buffer 716 also receives pulse shaping settings from the pulse shaping register 718, which couples the low-frequency signal component (i.e., DC laser signal) and the high-frequency signal component (e.g., laser pulse signals). Typically, high-speed signal paths that carry the high-frequency signal component require a differential configuration so that the transmission line effects from the AMP buffer can be well controlled. The pulse buffer 716 may be used to counter the transmission line effects and preserve signal fidelity. As shown, the serial data path of the channel interconnect 504 transmits the pulse shaping settings from the DC bias/shaping register 712 located on the channel 506 to the pulse shaping register 718 located on the R/W circuit 502. The pulse shaping register 718 may be implemented by any form of volatile or non-volatile memory such as ROM, flash memory, MRAM, DRAM, or SRAM. In one embodiment, the pulse shaping settings may be transmitted directly to the pulse buffer without the use of a pulse shaping register 718. In another embodiment, the pulse shaping settings may be sent to the pulse generator 708 on the channel 506 rather than being transmitted to the read/write circuit 502. The pulse shaping settings are then used by the pulse buffer 716 to filter and shape the signal (e.g., a series of high-frequency pulses) produced by the pulse generator 708. Doing so enables the signal to fit in a designated frequency band when transmitting the laser signal in a bandwidth limited communication channel.

After the R/W phase control 714 has resynchronized the phases of the write and laser signals and the pulse shaping settings have been applied to the laser signal, the pulse buffer 716 transmits the laser signal to an adder 722 that adds a DC offset or bias to the high-frequency pulses. The DC bias register 720 provides the DC offset (i.e., the low frequency component) for the laser signal leaving the pulse buffer 716 and may be implemented by any form of volatile or non-volatile memory such as ROM, flash memory, MRAM, DRAM, or SRAM. As stated previously, the DC bias register 720 may provide settings that predefine the DC bias of the laser during particular occurrences, such as when the laser first powers on. After leaving the adder 722, the laser signal may look substantial the same as the laser signal shown in the FIGS. 4A-4B. The laser signal is then sent via the laser driver (LD) port to a laser driver to be transformed into a modulated current.

In one embodiment, the hard drive 500 includes sensors or detectors for measuring environmental parameters such as the temperature of the magnetic disk 112 or the hard drive 500 itself. As shown in FIG. 7, the output from the sensors or detectors forms a feedback loop to adjust the DC bias of the laser signal. The output from the sensors is received by the thermal sensor (TS) port of the read/write circuit 502, amplified, and sent to the circuit element 724. The circuit element 724 takes the output of the sensors and the output of the DC bias register 720 and determines an adjusted DC offset. The circuit element 724 then transmits the adjusted DC offset to the adder 722 to be added to the high-frequency component of the laser signal. Referring to FIG. 2, between time 2 and time 3, the sensors may detect that the temperature of the magnetic disk is too low to significantly lower the coercivity of the magnetic media of the data bits. Accordingly, the circuit element 724 receives the output of the sensor and increases the DC offset to provide more current to the laser to increase the intensity of the beam spot on the magnetic media.

In one embodiment, the circuit element 724, DC bias register 720, adder 722, and TS port may be located on the channel 506. In this manner, both the low- and high-frequency components of the laser signal may be combined by placing the circuit element 724, adder 722, and TS port in the channel 506. Advantageously, this prevents having to transmit the DC bias settings from the DC bias/shaping register 712 located on the channel 506 to the DC bias register 720 located on the read/write circuit 502. Instead, the DC bias/shaping register 712 couples directly to the circuit element 724.

In one embodiment, the hard drive 500 may not include the sensors or detectors for monitoring environmental parameters. Placing the DC-offset feedback loop (i.e., the DC bias register 720, the circuit element 724, and the TS port) on the read/write circuit 506 moves these loop elements closer to the sensors that may be located near the magnetic disk 112.

In one embodiment, the channel 502 and the read/write circuit 506 may be combined into a single integrated circuit. Doing so eliminates the channel interconnect 504 between the two. In addition, the read/write phase control 714 may be unnecessary since temperature no longer significantly alters the synchronized phases of the write and laser signals when they are transmitted between the channel 506 and the read/write circuit 502. Moreover, the functions of the pulse shaping register 718 and the DC bias register 720 may be performed by the DC bias/shaping register 712.

By providing a circuit that produces a high-frequency signal for modulating a laser, the effect of a beam spot on surrounding data tracks not being written to is minimized. Moreover, the circuit may combine the high-frequency signal with a DC bias to further control the laser and the heat being transferred to a high-coercivity media. Additional phase control permits the circuit to synchronize the respective phases of the high-frequency signal and a write signal.

While the foregoing is directed to embodiments of the present invention, other and further embodiments of the invention may be devised without departing from the basic scope thereof, and the scope thereof is determined by the claims that follow.

The invention claimed is:

1. An integrated circuit in a hard disk drive comprising:
a first signal generator configured to generate a high-frequency signal for driving a heating element that heats magnetic media in a magnetic disk;
a phase controller configured to synchronize a phase of the high-frequency signal with a phase of a write data signal according to a predetermined setting, the write data signal controlling the writing of data to the magnetic disk; and
an adder circuit configured to combine the high-frequency signal with a DC bias for driving the heating element, wherein a value of the DC bias changes based on an operational state of the hard disk drive.

2. The integrated circuit of claim 1, further comprising a second signal generator configured to generate the write data signal, the write data signal based on received data to be written to the magnetic disk.

3. The integrated circuit of claim 2, further comprising a clock signal generator configured to generate the clock signal, wherein the clock signal generator generates the clock signal independently of the write data signal.

4. The integrated circuit of claim 1, wherein the predetermined setting instructs the phase controller to (i) match the phases of the high-frequency signal and the write data signal or (ii) change the phase of one of the high-frequency signal and write data signal with respect to the phase of the other such that the high-frequency signal is at least one of rising and at a maximum when the write data signal is reversing the magnetic orientation of the magnetic media.

5. The integrated circuit of claim 1, wherein the high-frequency signal is a square wave or a series of pulses.

6. The integrated circuit of claim 5, wherein the first signal generator is configured to change the duty cycle of the square wave or series of pulses according to the predetermined settings to affect the ability of the heating element to heat the magnetic media.

7. The integrated circuit of claim 6, further comprising a memory configured to store the predetermined settings.

8. The integrated circuit of claim 1, further comprising a memory element storing DC settings that provide the value of the DC bias based on an environmental parameter of the hard disk drive.

9. A system comprising:
a first integrated circuit comprising:
means for generating a high-frequency signal for driving a heating element that heats magnetic media in a magnetic disk; and
first means for synchronizing a phase of the high-frequency signal with a phase of a write data signal according to a predetermined setting, the write data signal controlling the writing of data to the magnetic disk;
a second integrated circuit comprising:
an adder circuit configured to receive the high-frequency signal and combine the high-frequency signal with a DC bias, and
second means for synchronizing the phase of the high-frequency signal with the phase of the write data signal according to the predetermined setting; and
an interconnect comprising a plurality of data paths coupling the first and second integrated circuits.

10. The system of claim 9, further comprising a first memory on the second integrated circuit configured to store a predetermined DC bias setting, wherein the DC bias is determined by the predetermined DC bias setting.

11. A system, comprising:
a first integrated circuit comprising:
means for generating a high-frequency signal for driving a heating element that heats magnetic media in a magnetic disk,
means for synchronizing a phase of the high-frequency signal with a phase of a write data signal according to a predetermined setting, the write data signal controlling the writing of data to the magnetic disk, and
a first memory configured to store a predetermined DC bias setting, wherein the DC bias is determined by the predetermined DC bias,
a second integrated circuit comprising:
an adder circuit configured to receive the high-frequency signal and combine the high-frequency signal with a DC bias;
a second memory configured to store the predetermined DC bias setting; and
an interconnect comprising a plurality of data paths coupling the first and second integrated circuits,
wherein the first memory is configured to transmit the predetermined DC bias setting to the second memory via the interconnect.

12. A system, comprising:
a first integrated circuit comprising:
means for generating a high-frequency signal for driving a heating element that heats magnetic media in a magnetic disk; and
means for synchronizing a phase of the high-frequency signal with a phase of a write data signal according to a predetermined setting, the write data signal controlling the writing of data to the magnetic disk;
a second integrated circuit comprising:
an adder circuit configured to receive the high-frequency signal and combine the high-frequency signal with a DC bias, and
a feedback controller on the second integrated circuit configured to receive information based on environmental parameters of the system, the feedback controller configure to use the information to adjust the DC bias; and an interconnect comprising a plurality of data paths coupling the first and second integrated circuits.

13. A system, comprising:

a first integrated circuit comprising:

means for generating a high-frequency signal for driving a heating element that heats magnetic media in a magnetic disk; and means for synchronizing a phase of the high-frequency signal with a phase of a write data signal according to a predetermined setting, the write data signal controlling the writing of data to the magnetic disk;

a second integrated circuit comprising:

an adder circuit configured to receive the high-frequency signal and combine the high-frequency signal with a DC bias; and an interconnect comprising a plurality of data paths coupling the first and second integrated circuits, wherein the interconnect includes at least one data path assigned to each of the write data signal and a read data signal, the read data signal representing data bits read from the magnetic disk.

14. The system of claim 13, wherein the first integrated circuit is configured to transmit the high-frequency signal to the second integrated circuit using only the at least one data path of the interconnect assigned to the read data signal.

15. A method for generating a signal for driving a heating element that heats magnetic media in a magnetic disk in a hard disk drive, comprising:

receiving a write data signal, the write data signal controlling the writing of data to the magnetic disk;

generating a high-frequency signal for driving the heating element based on a clock signal within the hard disk drive;

synchronizing a phase of the high-frequency signal with a phase of a write data signal according to predetermined settings; and combining the high-frequency signal with a DC bias signal, wherein a value of the DC bias changes based on an operational state of the hard disk drive.

16. The method of claim 15, wherein the high-frequency signal and the write data signal are both based on the clock signal.

17. The method of claim 15, wherein the predetermined settings instruct a phase controller to (i) match the phases of the high-frequency signal and write data signal or (ii) change the phase of one of the high-frequency signal and write data signal with respect to the phase of the other such that the high-frequency signal is at least one of rising and at a maximum when the write data signal is reversing the magnetic orientation of the magnetic media.

18. The method of claim 15, wherein the high-frequency signal is a square wave or a series of pulses.

19. The method of claim 18, further comprising modifying the duty cycles of the square wave or series of pulses according to the predetermined settings to affect the ability of the heating element to heat the magnetic media.

20. The method of claim 15, further comprising:

setting the value of the DC bias signal based on an environmental parameter of the hard disk drive.

* * * * *